United States Patent
Evans et al.

(10) Patent No.: US 9,921,827 B1
(45) Date of Patent: Mar. 20, 2018

(54) DEVELOPING VERSIONS OF APPLICATIONS BASED ON APPLICATION FINGERPRINTING

(71) Applicant: Amazon Technologies, Inc., Reno, NV (US)

(72) Inventors: Ethan Zane Evans, Snoqualmie, WA (US); David Allen Markley, Bellevue, WA (US); Paul Allan Ryder, Issaquah, WA (US); Miguel Azancot Roque, Seattle, WA (US); James Newton Adkins, III, Bellevue, WA (US); Ameesh Paleja, Irvine, CA (US); Christopher Lawrence Lavin, Seattle, WA (US); Jason Shih Shen Chein, Bellevue, WA (US); Michael Anthony Frazzini, Seattle, WA (US); Aaron Curtis Rubenson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 537 days.

(21) Appl. No.: 13/926,683

(22) Filed: Jun. 25, 2013

(51) Int. Cl.
*G06F 9/44* (2006.01)

(52) U.S. Cl.
CPC . *G06F 8/71* (2013.01); *G06F 8/36* (2013.01)

(58) Field of Classification Search
None
See application file for complete search history.

(56) References Cited

U.S. PATENT DOCUMENTS

| | | |
|---|---|---|
| 5,699,507 A | 12/1997 | Goodnow, II et al. |
| 5,892,900 A | 4/1999 | Ginter et al. |
| 6,141,698 A | 10/2000 | Krishnan et al. |
| 6,285,985 B1 | 9/2001 | Horstmann |
| 6,496,936 B1 | 12/2002 | French et al. |
| 7,266,702 B2 | 9/2007 | Hotti |
| 7,318,092 B2 | 1/2008 | Sutler |
| 7,428,411 B2 | 9/2008 | Zellner |
| 7,467,205 B1 | 12/2008 | Dempster et al. |
| 7,523,191 B1 | 4/2009 | Thomas et al. |
| 7,853,984 B2 | 12/2010 | Antell et al. |
| 8,051,298 B1 | 11/2011 | Burr et al. |

(Continued)

OTHER PUBLICATIONS

Amruta Gokhale, "Inferring Likely Mappings Between APIs", May 2013, Rutgers University, Piscataway, NJ, USA.*

(Continued)

*Primary Examiner* — Wynuel Aquino
(74) *Attorney, Agent, or Firm* — Thomas Horstemeyer, LLP (57) ABSTRACT

Disclosed are various embodiments for developing versions of applications based on application fingerprinting. For example, an application may be ported from one operating system platform to another, or an application may be modified to be compatible with a specific device. In one embodiment, an application fingerprint is received for an application. The application fingerprint may be generated based at least in part on a static analysis of the application and a dynamic analysis of the application. A device that is incompatible with the application based at least in part on the application fingerprint may be determined. A modification to the application to make the application compatible with the device may be determined.

21 Claims, 5 Drawing Sheets

(56) References Cited

U.S. PATENT DOCUMENTS

| | | | |
|---|---|---|---|
| 8,191,164 B2 | 5/2012 | Pepin et al. | |
| 8,224,934 B1 | 7/2012 | Dongre et al. | |
| 8,244,799 B1 | 8/2012 | Salusky et al. | |
| 8,255,280 B1 | 8/2012 | Kay et al. | |
| 8,296,445 B1 | 10/2012 | Hackborn et al. | |
| 8,380,219 B1 | 2/2013 | Wick et al. | |
| 8,396,759 B2 | 3/2013 | Mehta et al. | |
| 8,452,797 B1 | 5/2013 | Paleja et al. | |
| 8,478,747 B2 | 7/2013 | Jeong et al. | |
| 8,601,010 B1 | 12/2013 | Felton et al. | |
| 8,612,470 B1 | 12/2013 | Fushman et al. | |
| 8,725,585 B1 | 5/2014 | Kay et al. | |
| 8,953,199 B2 | 2/2015 | Kumarahalli et al. | |
| 8,990,353 B2 | 3/2015 | Repasi | |
| 9,053,307 B1 | 6/2015 | Johansson et al. | |
| 9,058,612 B2 | 6/2015 | Ben-Itzhak | |
| 9,262,470 B1 | 2/2016 | Evans et al. | |
| 9,449,042 B1 | 9/2016 | Evans et al. | |
| 2001/0021914 A1 | 9/2001 | Jacobi et al. | |
| 2002/0188854 A1 | 12/2002 | Heaven et al. | |
| 2003/0200152 A1 | 10/2003 | Divekar | |
| 2004/0083394 A1 | 4/2004 | Brebner et al. | |
| 2005/0165656 A1 | 7/2005 | Frederick et al. | |
| 2005/0171961 A1 | 8/2005 | Culbreth et al. | |
| 2006/0075500 A1 | 4/2006 | Bertman et al. | |
| 2006/0184415 A1 | 8/2006 | Cleavenger | |
| 2007/0022409 A1 | 1/2007 | Levenshteyn | |
| 2007/0124290 A1 | 5/2007 | Swanson et al. | |
| 2007/0136207 A1 | 6/2007 | Davydov et al. | |
| 2007/0174490 A1 | 7/2007 | Choi et al. | |
| 2008/0155651 A1 | 6/2008 | Wasmund | |
| 2008/0184367 A1 | 7/2008 | McMillan et al. | |
| 2008/0229382 A1 | 9/2008 | Vitalos | |
| 2008/0244534 A1 | 10/2008 | Golender et al. | |
| 2008/0250323 A1 | 10/2008 | Huff | |
| 2008/0313633 A1 | 12/2008 | Zhu et al. | |
| 2009/0044177 A1 | 2/2009 | Bates et al. | |
| 2009/0049544 A1 | 2/2009 | Kashi | |
| 2009/0089869 A1 | 4/2009 | Varghese | |
| 2009/0094107 A1 | 4/2009 | Torkelson et al. | |
| 2009/0182864 A1 | 7/2009 | Khan et al. | |
| 2009/0260075 A1 | 10/2009 | Gedge et al. | |
| 2010/0036783 A1 | 2/2010 | Rodriguez | |
| 2010/0087188 A1 | 4/2010 | Griff et al. | |
| 2010/0115610 A1 | 5/2010 | Tredoux | |
| 2010/0122329 A1 | 5/2010 | Jakobsson et al. | |
| 2010/0125505 A1 | 5/2010 | Puttaswamy | |
| 2010/0131835 A1 | 5/2010 | Kumar et al. | |
| 2010/0211863 A1 | 8/2010 | Jones et al. | |
| 2010/0274597 A1 | 10/2010 | Dill | |
| 2011/0022477 A1 | 1/2011 | Hatridge et al. | |
| 2011/0030061 A1 | 2/2011 | Artzi et al. | |
| 2011/0105103 A1 | 5/2011 | Ullrich | |
| 2011/0161137 A1 | 6/2011 | Ubalde et al. | |
| 2011/0184899 A1 | 7/2011 | Gadanho et al. | |
| 2011/0225644 A1 | 9/2011 | Pullikottil et al. | |
| 2011/0265077 A1 | 10/2011 | Collison et al. | |
| 2011/0289098 A1 | 11/2011 | Oztaskent et al. | |
| 2011/0307354 A1 | 12/2011 | Erman et al. | |
| 2012/0042383 A1 | 2/2012 | Greene et al. | |
| 2012/0079576 A1 | 3/2012 | Han et al. | |
| 2012/0110174 A1 | 5/2012 | Wootton et al. | |
| 2012/0137340 A1 | 5/2012 | Jakobsson | |
| 2012/0174058 A1 | 7/2012 | Winkler et al. | |
| 2012/0180126 A1 | 7/2012 | Liu et al. | |
| 2012/0198491 A1 | 8/2012 | O'Connell et al. | |
| 2012/0210423 A1 | 8/2012 | Friedrichs et al. | |
| 2012/0216244 A1 | 8/2012 | Kumar et al. | |
| 2012/0240236 A1 | 9/2012 | Wyatt et al. | |
| 2012/0323704 A1 | 12/2012 | Steelberg et al. | |
| 2013/0046965 A1 | 2/2013 | Vin et al. | |
| 2013/0054433 A1 | 2/2013 | Giard et al. | |
| 2013/0055227 A1* | 2/2013 | Zachariah | G06F 8/51 717/168 |
| 2013/0055367 A1 | 2/2013 | Kshirsagar et al. | |
| 2013/0061054 A1 | 3/2013 | Niccolai | |
| 2013/0097659 A1 | 4/2013 | Das et al. | |
| 2013/0097673 A1 | 4/2013 | Meehan et al. | |
| 2013/0097706 A1 | 4/2013 | Titonis et al. | |
| 2013/0124641 A1 | 5/2013 | Ryabchun et al. | |
| 2013/0133033 A1 | 5/2013 | Davis et al. | |
| 2013/0159134 A1 | 6/2013 | Chervirala et al. | |
| 2013/0160126 A1 | 6/2013 | Kapoor et al. | |
| 2013/0166357 A1 | 6/2013 | Eggs et al. | |
| 2013/0167207 A1 | 6/2013 | Davis et al. | |
| 2013/0167231 A1 | 6/2013 | Raman et al. | |
| 2013/0185722 A1 | 7/2013 | Kruglick | |
| 2013/0196615 A1 | 8/2013 | Zalmanovitch et al. | |
| 2013/0212684 A1 | 8/2013 | Li et al. | |
| 2013/0239191 A1 | 9/2013 | Bostick | |
| 2013/0254880 A1 | 9/2013 | Alperovitch et al. | |
| 2013/0333026 A1 | 12/2013 | Starink et al. | |
| 2013/0347094 A1 | 12/2013 | Bettini et al. | |
| 2014/0003358 A1 | 1/2014 | Elliott | |
| 2014/0020094 A1 | 1/2014 | Wang et al. | |
| 2014/0059684 A1 | 2/2014 | Wyschogrod et al. | |
| 2014/0137080 A1* | 5/2014 | Huang | G06F 9/44505 717/121 |
| 2014/0137223 A1 | 5/2014 | Wagner et al. | |
| 2014/0156877 A1 | 6/2014 | Tylik et al. | |
| 2014/0165140 A1 | 6/2014 | Singla | |
| 2014/0245268 A1 | 8/2014 | Golender et al. | |
| 2014/0280211 A1 | 9/2014 | Rash et al. | |
| 2014/0282456 A1* | 9/2014 | Drost | G06F 8/76 717/158 |
| 2015/0082290 A1* | 3/2015 | Peled | G06F 8/76 717/137 |
| 2015/0261945 A1 | 9/2015 | Johansson et al. | |

OTHER PUBLICATIONS

U.S. Appl. No. 13/926,574, filed Jun. 25, 2013 and entitled "Application Recommendations Based on Application and Lifestyle Fingerprinting".

U.S. Appl. No. 13/926,234, filed Jun. 25, 2013 and entitled "Recommending Improvements to and Detecting Defects Within Applications".

U.S. Appl. No. 13/926,607, filed Jun. 25, 2013 and entitled "Application Fingerprinting".

U.S. Appl. No. 13/926,656, filed Jun. 25, 2013 and entitled "Application Monetization Based on Application and Lifestyle Fingerprinting".

U.S. Appl. No. 13/926,211, filed Jun. 25, 2013 and entitled "Analyzing Security of Applications".

U.S. Appl. No. 13/926,215, filed Jun. 25, 2013 and entitled "Identifying Relationships Between Applications".

U.S. Appl. No. 13/215,972, filed Aug. 23, 2011 and entitled "Collecting Application Usage Metrics".

U.S. Appl. No. 13/555,724, filed Jul. 23, 2012 and entitled "Behavior Based Identity System".

Ami, Parvin, et al., "Seven Phrase Penetration Testing Model", International Journal of Computer Applications, vol. 59, No. 5, Dec. 2012, pp. 16-20.

Chun, Byung-Gon, et al., "CioneCioud: Elastic Execution between Mobile Device and Cloud", EuroSys '11, Salzburg, Austria, Apr. 10-13, 2011, pp. 301-314.

Dominica, Steena, et al., "Exemplifying Attack Identification and Analysis in a Novel Forensically Viable Syslog Model", SADFE 2008, Oakland, CA, May 22-28, 2008, pp. 57-68.

Hejazi, S.M., et al., "Extraction of forensically sensitive information from windows physical memory", Digital Investigation, vol. 6, © 2009, Elsevier Ltd., pp. S121-S131.

Hyrynsalmi, Sami, et al., "App Store, Marketplace, Playl—An Analysis of Multi-Homing in Mobile Software Ecosystems", IWSECO 2012 Workshop on Software Ecosystems, Cambridge, MA, Jun. 18, 2012, pp. 59-72.

Kim, Jognwoo et al., Recommendation algorithm of the app store by using semantic relations between apps. Journal of Supercomputing 65.1 (Jul. 11, 2013): 16-26.

(56) References Cited

OTHER PUBLICATIONS

Su, X., et al., "Smartphone Dual Defense Protection Framework: Detecting malicious applications in Android Markets", MSN 2012, Chengdu, Sichuan, China, Dec. 14-16, 2012, pp. 153-160.
Xiong, Pulei, et al., "Model-Based Penetration Test Framework for Web Applications Using TTCN-3", MCETECH 2009, LNBIP 26, Springer-Verlag Berlin, Germany, © 2009, pp. 141-154.
Yang, Fang, et al., "Research of Application Protocol Identification System Based DPI and DFI", Recent Advances in CSIE 2011, CSIE 2011, LNEE 127, Springer-Verlag, Berlin, Germany, Feb. 11, 2012, pp. 305-310.
U.S. Appl. No. 13/926,211, filed Jun. 25, 2013, Notice of Allowance dated Jan. 5, 2017.
U.S. Appl. No. 13/926,211 filed Jun. 25, 2013, Response to Non-Final Office Action dated Aug. 11, 2016.
U.S. Appl. No. 13/926,211, filed Jun. 25, 2013, Non-Final Office Action dated Aug. 11, 2016.
U.S. Appl. No. 13/926,211, filed Jun. 25, 2013, Response to Final Office Action dated Apr. 7, 2016.
U.S. Appl. No. 13/926,211, filed Jun. 25, 2013, Final Office Action dated Apr. 7, 2016.
U.S. Appl. No. 13/926,211, filed Jun. 25, 2013, Response to Non-Final Office Action dated Jun. 25, 2015.
U.S. Appl. No. 13/926,211, filed Jun. 25, 2013, Non-Final Office Action dated Jun. 25, 2015.
U.S. Appl. No. 13/926,656, filed Jun. 25, 2013, Response to Non-Final Office Action dated Jun. 2, 2016.
U.S. Appl. No. 13/926,656, filed Jun. 25, 2013, Non-Final Office Action dated Jun. 2, 2016.
U.S. Appl. No. 13/926,607, filed Jun. 25, 2013, Response to Final Office Action dated Jun. 30, 2016.
U.S. Appl. No. 13/926,607, filed Jun. 25, 2013, Final Office Action dated Jun. 30, 2016.
U.S. Appl. No. 13/926,607, filed Jun. 25, 2013, Response to Non-Final Office Action dated Dec. 3, 2015.
U.S. Appl. No. 13/926,607, filed Jun. 25, 2013, Non-Final Office Action dated Dec. 3, 2015.
U.S. Appl. No. 13/926,215, filed Jun. 25, 2013, Notice of Allowance dated Jun. 2, 2016.
U.S. Appl. No. 13/926,215, filed Jun. 25, 2013, Response to Final Office Action dated Oct. 30, 2015.
U.S. Appl. No. 13/926,215, filed Jun. 25, 2013, Final Office Action dated Oct. 30, 2015.
U.S. Appl. No. 13/926,215, filed Jun. 25, 2013, Response to Non-Final Office Action dated Apr. 10, 2015.
U.S. Appl. No. 13/926,215, filed Jun. 25, 2013, Non-Final Office Action dated Apr. 10, 2015.
U.S. Appl. No. 13/926,234, filed Jun. 25, 2013, Notice of Allowance dated May 31, 2016.
U.S. Appl. No. 13/926,234, filed Jun. 25, 2013, Response to Final Office Action dated Nov. 2, 2015.
U.S. Appl. No. 13/926,234, filed Jun. 25, 2013, Final Office Action dated Nov. 2, 2015.
U.S. Appl. No. 13/926,234, filed Jun. 25, 2013, Response to Non-Final Office Action dated Apr. 10, 2015.
U.S. Appl. No. 13/926,234, filed Jun. 25, 2013, Non-Final Office Action dated Apr. 10, 2015.
U.S. Appl. No. 13/926,574, filed Jun. 25, 2013, Notice of Allowance dated Oct. 9, 2015.
U.S. Appl. No. 13/926,574, filed Jun. 25, 2013, Response to Non-Final Office Action dated May 6, 2015.
U.S. Appl. No. 13/926,574, filed Jun. 25, 2013, Non-Final Office Action dated May 6, 2015.
U.S. Appl. No. 15/042,281, filed Feb. 12, 2016, Non-Final Office Action dated Feb. 21, 2017.
U.S. Appl. No. 15/042,281, filed Feb. 12, 2016, Notice of Allowance dated Nov. 21, 2016.
U.S. Appl. No. 13/215,972, filed Aug. 23, 2011, Final Office Action dated Jul. 12, 2017.
U.S. Appl. No. 13/215,972, filed Aug. 23, 2011, Response to Non-Final Office Action dated Jan. 4, 2017.
U.S. Appl. No. 13/215,972, filed Aug. 23, 2011, Non-Final Office Action dated Jan. 4, 2017.
U.S. Appl. No. 13/215,972, filed Aug. 23, 2011, Response to Final Office Action dated Nov. 2, 2015.
U.S. Appl. No. 13/215,972, filed Aug. 23, 2011, Final Office Action dated Nov. 2, 2015.
U.S. Appl. No. 13/215,972, filed Aug. 23, 2011, Response to Non-Final Office Action dated Apr. 17, 2015.
U.S. Appl. No. 13/215,972, filed Aug. 23, 2011, Non-Final Office Action dated Apr. 17, 2015.
U.S. Appl. No. 13/215,972, filed Aug. 23, 2011, Response to Restriction/Election dated May 15, 2013.
U.S. Appl. No. 13/215,972, filed Aug. 23, 2011, Restriction/Election dated May 15, 2013.
U.S. Appl. No. 13/555,724, filed Jul. 23, 2012, Notice of Allowance dated Feb. 2, 2015.
U.S. Appl. No. 13/555,724, filed Jul. 23, 2012, Response to Non-Final Office Action dated Mar. 24, 2014.
U.S. Appl. No. 13/555,724, filed Jul. 23, 2012, Non-Final Office Action dated Mar. 24, 2014.
U.S. Appl. No. 13/555,724, filed Jul. 23, 2012, Response to Final Office Action dated Oct. 23, 2014.
U.S. Appl. No. 13/555,724, filed Jul. 23, 2012, Final Office Action dated Oct. 23, 2014.
U.S. Appl. No. 14/727,183, filed Jun. 1, 2015, Final Office Action dated Jun. 1, 2017.
U.S. Appl. No. 14/727,183, filed Jun. 1, 2015, Response to Non-Final Office Action dated Nov. 18, 2016.
U.S. Appl. No. 14/727,183, filed Jun. 1, 2015, Non-Final Office Action dated Nov. 18, 2016.
U.S. Appl. No. 15/042,281, filed Feb. 12, 2016, Final Office Action dated Jul. 5, 2017.
U.S. Appl. No. 15/042,281, filed Feb. 12, 2016, Response to Non-Final Office Action dated Feb. 21, 2017.
U.S. Appl. No. 13/926,607, filed Jun. 25, 2013, Non-Final Office Action dated Jun. 2, 2017.
U.S. Appl. No. 13/926,656, filed Jun. 25, 2013, Response to Final Office Action dated Mar. 20, 2017.
U.S. Appl. No. 13/926,656, filed Jun. 25, 2013, Final Office Action dated Mar. 20, 2017.

\* cited by examiner

DEVELOPING VERSIONS OF APPLICATIONS BASED ON APPLICATION FINGERPRINTING

BACKGROUND

An application marketplace may offer a multitude of different applications, such as mobile applications. For example, the applications may include games, email applications, social networking applications, mapping applications, imaging applications, music playing applications, shopping applications, and so on. Various applications may use different hardware features and may employ different software libraries. Some applications may run well on one type of computing device but run poorly on another type of computing device. Some applications may have defects that result in crashes, poor rendering performance, high resource consumption, and/or other problems.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to developing versions of applications to facilitate compatibility with different devices and/or operating systems. The application versions are developed based upon profiles of applications, referred to herein as application fingerprints. An application fingerprint uniquely identifies an application based on, for example, what application programming interfaces (API) it uses, what software libraries it uses, what hardware devices it accesses, typical resource consumption patterns, and/or other characteristics. In some embodiments, the application fingerprint may also identify typical user behavior relative to the application. The application fingerprints may have many uses, including application search, application categorization, defect detection, application versioning and porting, and so on.

Various techniques relating to application fingerprinting are described in U.S. Patent Application entitled "APPLICATION FINGERPRINTING" filed Jun. 25, 2013 under Ser. No. 13/926,607; U.S. Patent Application entitled "APPLICATION MONETIZATION BASED ON APPLICATION AND LIFESTYLE FINGERPRINTING" filed Jun. 25, 2013 under Ser. No. 13/926,656; U.S. Patent Application entitled "APPLICATION RECOMMENDATIONS BASED ON APPLICATION AND LIFESTYLE FINGERPRINTING" filed Jun. 25, 2013 under Ser. No. 13/926,574; U.S. Patent Application entitled "IDENTIFYING RELATIONSHIPS BETWEEN APPLICATIONS" filed Jun. 25, 2013 under Ser. No. 13/926,215; U.S. Patent Application entitled "RECOMMENDING IMPROVEMENTS TO AND DETECTING DEFECTS WITHIN APPLICATIONS" filed Jun. 25, 2013 under Ser. No. 13/926,234; and U.S. Patent Application entitled "ANALYZING SECURITY OF APPLICATIONS" filed Jun. 25, 2013 under Ser. No. 13/926,211; all of which are incorporated herein by reference in their entirety.

Figure 1:
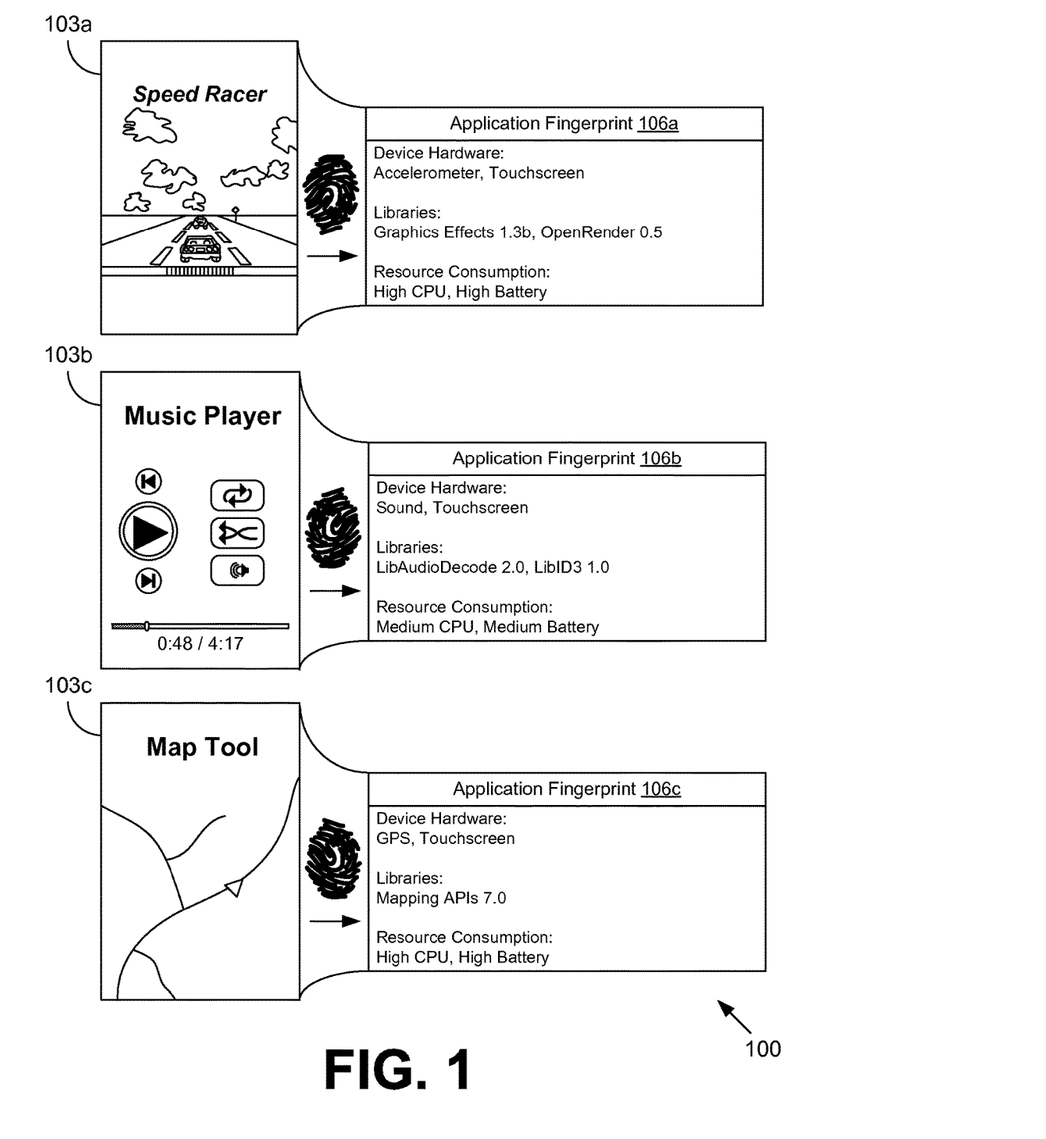
FIG. 1 is a drawing of an exemplary application fingerprint scenario according to various embodiments of the present disclosure.

With reference to FIG. 1, illustrated is an exemplary application fingerprint scenario 100. The exemplary application fingerprint scenario 100 involves three applications 103a, 103b, and 103c, for which corresponding application fingerprints 106a, 106b, and 106c have been generated. The exemplary applications 103 are representative of the multitude of applications 103 that may be offered by an application marketplace. In this non-limiting example, the application 103a corresponds to a game, the application 103b corresponds to a music player, and the application 103c corresponds to a mapping application. Each of the applications 103 has its own respective application fingerprint 106 that can function to distinguish one application 103 from another and/or to identify similarities between applications 103.

In the non-limiting example of FIG. 1, each of the application fingerprints 106 identifies characteristics relating to device hardware used, software libraries used, and resource consumption. In other examples, additional or different characteristics may be represented by the application fingerprints 106 such as usage or behavioral metrics associated with use of the application by users. Here, the application fingerprint 106a indicates that the application 103a uses the accelerometer and touchscreen of the device and the software libraries named "Graphics Effects 1.3b" and "OpenRender 0.5." Also, the application 103a is associated with high processor and battery usage. The application fingerprint 106b indicates that the application 103b uses a sound device and the touchscreen of the device and the software libraries named "LibAudioDecode 2.0" and "LibID3 1.0." The application 103b is associated with medium processor and battery usage. The application fingerprint 106c indicates that the application 103c uses a global positioning system (GPS) device and a touchscreen, while using the software library named "Mapping APIs 7.0." The application 103c is associated with high processor and battery usage. In the following discussion, a general description of the system and its components is provided, followed by a discussion of the operation of the same.

Figure 2:
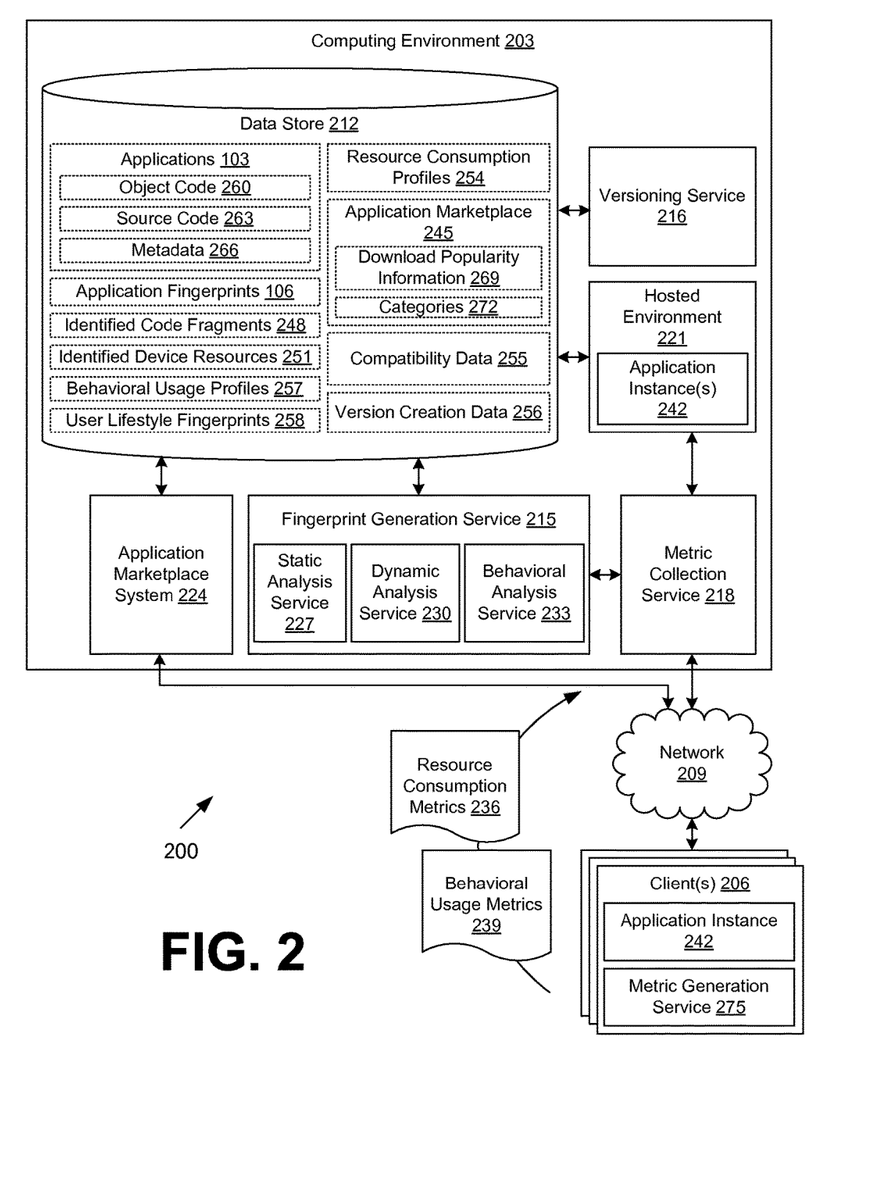
FIG. 2 is a drawing of a networked environment according to various embodiments of the present disclosure.

Turning now to FIG. 2, shown is a networked environment 200 according to various embodiments. The networked environment 200 includes a computing environment 203 and one or more clients 206 in data communication via a network 209. The network 209 includes, for example, the Internet, intranets, extranets, wide area networks (WANs), local area networks (LANs), wired networks, wireless networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a cloud computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a fingerprint generation service 215, a versioning service 216, a metric collection service 218, a hosted environment 221, an application marketplace system 224, and other applications, services, processes, systems, engines, or functionality not discussed in detail herein. The fingerprint generation service 215 is executed to generate application fingerprints 106 for applications 103 as will be described. To this end, the fingerprint generation service 215 may include a static analysis service 227, a dynamic analysis service 230, and a behavioral analysis service 233 for performing static analysis, dynamic analysis, and behavioral analysis on the application 103. The results of the analyses may be incorporated in the resulting application fingerprint 106.

The versioning service 216 is executed to facilitate developing new versions of applications 103 based at least in part on the application fingerprints 106. For example, the versioning service 216 may be employed to facilitate developing a version of an application 103 that is compatible with a different operating system platform, another version of a currently compatible operating system, different computing device hardware, different software resources, and so on. In some cases, such versioning may be referred to as porting. In order to facilitate developing new versions for a particular application 103, the versioning service 116 may, for example, examine the application fingerprints 106 for applications 103 similar to the particular application 103 to assess the changes necessary to develop the new version of the application 103.

Further, the versioning service 116 may assess compatibility based at least in part on the application fingerprints 106. In one embodiment, information relating to developing the new version, such as estimated complexity, estimated cost, etc. may be presented to a party associated with the application 103. In another embodiment, some or all of the development of the new version may be performed by the versioning service 216. To this end, the versioning service 216 may modify code of the application 103, replace software libraries, and/or perform other modifications in order for the application 103 to exhibit the desired compatibility.

The metric collection service 218 is executed to obtain various metrics for use by the fingerprint generation service 215 in generating application fingerprints 106. Such metrics may include resource consumption metrics 236, behavioral usage metrics 239, and/or other types of metrics. The hosted environment 221 is configured to execute an application instance 242 for use in dynamic analysis and resource consumption profiling by the fingerprint generation service 215. To this end, the hosted environment 221 may comprise an emulator or other virtualized environment for executing the application instance 242.

The application marketplace system 224 is executed to provide functionality relating to an application marketplace 245, where a multitude of applications 103 may be submitted by developers and made available for purchase and/or download. The application marketplace system 224 may include functionality relating to electronic commerce, e.g., shopping cart, ordering, and payment systems. The application marketplace system 224 may support searching and categorization functionality so that users may easily locate applications 103 that are of interest. The application marketplace system 224 may include functionality relating to verification of compatibility of applications 103 with various clients 206.

The data stored in the data store 212 includes, for example, applications 103, application fingerprints 106, identified code fragments 248, identified device resources 251, resource consumption profiles 254, compatibility data 255, version creation data 256, behavioral usage profiles 257, user lifestyle fingerprints 258, data relating to an application marketplace 245, and potentially other data. The applications 103 correspond to those applications 103 that have been submitted by developers and/or others, for example, for inclusion in the application marketplace 245. The applications 103 may correspond to game applications, email applications, social network applications, mapping applications, and/or any other type of application 103. In one embodiment, the applications 103 correspond to mobile applications 103 for use on mobile devices such as, for example, smartphones, tablets, electronic book readers, and/or other devices.

Each application 103 may include, for example, object code 260, source code 263, metadata 266, and/or other data. The object code 260 corresponds to code that is executable by clients 206, either natively by a processor or by way of a virtual machine executed by the processor. The source code 263 corresponds to the source for the application 103 as written in a programming language. In some cases, the source code 263 may be generated by way of decompiling the object code 260. The source code 263 may be executable by clients 206 through the use of an interpreter. The metadata 266 may declare compatibility with various clients 206, software libraries or other code fragments 248 used by the application 103, device resources used by the application 103, and/or other information. In one embodiment, an application 103 is distributed as a "package" including the object code 260 and the metadata 266. In some cases, the metadata 266 may include documentation such as unified modeling language (UML), Javadoc documentation, and/or other forms of documentation for the application 103.

The application fingerprints 106 each identify a respective application 103 by its characteristics. In one embodiment, an application fingerprint 106 corresponds to a summarized numerical value. In various embodiments, the application fingerprint 106 may be stored as a string. The application fingerprint 106 may include various unique identifiers for device resources, code fragments, graphical assets used by the application 103, files accessed by the application 103, and/or characteristics of the application 103. The application fingerprint 106 may indicate resource consumption profiles 254 and/or behavioral usage profiles 257.

The identified code fragments 248 correspond to various code libraries or fragments and application programming interface (API) calls that are used by various applications 103. Unlike custom code that is specific to an application 103, the identified code fragments 248 include functionality that may be employed and reused by many different applications 103 in either an exact or substantially similar form. As an example, a code fragment 248 may correspond to a software library. As another example, a code fragment 248 may correspond to open-source reference code for performing some function. Each of the identified code fragments 248 may have a corresponding version, and multiple different versions of the software library may be employed by the applications 103. Unique identifiers may be associated with each identified code fragment 248 and/or various API calls within each identified code fragment 248. Various data may be stored indicating how the various code fragments 248 are employed, e.g., to render specific user interface elements, to obtain a specific user gesture, and so on.

The identified device resources 251 correspond to the various hardware and/or software requirements of the applications 103. For example, various applications 103 may require or request access to hardware devices on clients 206 such as accelerometers, touchscreens having a certain resolution/size, GPS devices, network devices, storage devices, and so on. Additionally, various applications 103 may access application resources on clients 206. Such application resources may include sound files, graphical assets, graphical textures, images, buttons, user interface layouts, and so on. Such application resources may include data items on clients 206, e.g., contact lists, text messages, browsing history, etc. Identifiers for such application resources may be included in a generated application fingerprint 106. It is noted that the identified device resources 251 may include static resources and runtime resources.

The resource consumption profiles 254 correspond to profiles of resource consumption for applications 103 that are generated from resource consumption metrics 236 collected by the metric collection service 218. The resource consumption profiles 254 may indicate processor usage, memory usage, battery usage, network usage, and/or other resources that are consumed. The resource consumption profiles 254 may indicate maximum consumption, average consumption, median consumption, minimum consumption, and/or other statistics for a particular application 103.

The compatibility data 255 may indicate compatibility specifications for various operating systems versions and platforms, computing devices, identified code fragments 248, identified device resources 251, and so on. Alternatively, the compatibility data 255 may indicate particular applications 103 that are deemed compatible with a particular platform, particular device, etc.

The version creation data 256 includes various data employed by the versioning service 216 to generate estimates of complexity and costs associated with creating a new version or port of an application 103. In some embodiments, the version creation data 256 may include configuration data to enable automatic generation of such versions or ports.

The behavioral usage profiles 257 correspond to profiles of behavioral usage for applications 103 that are generated from behavioral usage metrics 239 collected by the metric collection service 218. The behavioral usage profiles 257 may indicate average duration that the application instances 242 execute, times of day and/or locations where the application instances 242 are executed, privacy-related behaviors of the application instances 242 (e.g., whether contact lists are accessed, whether browsing history is accessed, and so forth), circumstances under which the application instances 242 crash (e.g., types of clients 206, types of wireless carriers, etc.), user demographics, and so on. The behavioral usage profiles 257 may incorporate synchronization history from a synchronization service. Metrics related to synchronization may be obtained from the client 206 and/or from the synchronization service.

The user lifestyle fingerprints 258 include data profiling various characteristics of particular users of the applications 103 based, for example, on data that the particular users have elected to share. The user lifestyle fingerprints 258 may record time periods (e.g., hours of the day, days of the week, etc.) during which the particular user typically uses certain types of applications 103. The user lifestyle fingerprints 258 may also record locations where the user typically users certain types of applications 103. As a non-limiting example, a user may employ a certain type of application 103 while at the office weekdays from 8 a.m. to 5 p.m., another type of application 103 while commuting weekdays from 7:30 a.m. to 8 a.m. and 5 p.m. to 5:30 p.m., and yet another type of application 103 while at home on weekdays from 5:30 p.m. to 8 p.m. and on weekends. To this end, the user lifestyle fingerprints 258 may be developed based at least in part on the behavioral usage metrics 239 received from clients 206 associated with the particular users.

Beyond merely the types of applications 103 that are preferred, the user lifestyle fingerprints 258 may also record specific components or libraries of applications 103 that are frequently used. Such a determination may be made through comparison with the application fingerprints 106. For example, a user may prefer applications 103 that use social networking functionality, global positioning system (GPS) functionality, or a flashlight functionality.

Additionally, the user lifestyle fingerprints 258 may also profile user-specific purchasing behavior via the application marketplace system 224. For example, a user lifestyle fingerprint 258 for a given user may indicate whether the user is a frequent purchaser regardless of cost, a reluctant cost-conscious purchaser, or a frequent purchaser from within an application 103. This information may be employed by the application marketplace system 224 to target specific versions of applications 103 (e.g., low-cost versions, high-cost versions, "freemium" versions, etc.) and to market effectively to specific categories of users.

Various techniques relating to collecting behavioral usage metrics 239 from applications 103 are described in U.S. patent application Ser. No. 13/215,972 entitled "COLLECTING APPLICATION USAGE METRICS" and filed on Aug. 23, 2011, which is incorporated herein by reference in its entirety. Various techniques relating to profiling user behavior are described in U.S. patent application Ser. No. 13/555,724 entitled "BEHAVIOR BASED IDENTITY SYSTEM" and filed on Jul. 23, 2012, which is incorporated herein by reference in its entirety.

The data associated with the application marketplace 245 includes, for example, download popularity information 269, categories 272, and/or other data. The download popularity information 269 indicates the popularity, either in terms of absolute number of downloads or in terms of relative popularity, of the applications 103 offered by the application marketplace 245. The categories 272 correspond to groupings of applications 103 that may indicate similar applications 103 and may be employed by users to more easily navigate the offerings of the application marketplace 245. Non-limiting examples of categories 272 may include social networking applications 103, mapping applications 103, movie information applications 103, shopping applications 103, music recognition applications 103, and so on.

The client 206 is representative of a plurality of client devices that may be coupled to the network 209. The client 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 206 may include a display comprising, for example, one or more devices such as liquid crystal display (LCD) displays, gas plasma-based flat panel displays, organic light emitting diode (OLED) displays, LCD projectors, or other types of display devices, etc.

The client 206 may be configured to execute various applications such as an application instance 242, a metric generation service 275, and/or other applications. The application instance 242 corresponds to an instance of an application 103 that has been downloaded to the client 206 from the application marketplace system 224. The application instance 242 may correspond to actual use by an end user or test use on a test client 206. The metric generation service 275 is configured to monitor the application instance 242 and report data that the user of the client 206 has elected to share with the metric collection service 218. Such data may include resource consumption metrics 236, behavioral usage metrics 239, and/or other data. The client 206 may be configured to execute applications beyond the application instance 242 and the metric generation service 275 such as, for example, browsers, mobile applications, email applications, social networking applications, and/or other applications.

Next, a general description of the operation of the various components of the networked environment 200 is provided. To begin, an application 103 is received by the computing environment 203. The fingerprint generation service 215 then begins processing the application 103 to generate an application fingerprint 106. Such initial processing may comprise a static analysis performed by the static analysis service 227.

To this end, the static analysis service 227 may compare the object code 260 and/or the source code 263 against identified code fragments 248. In one embodiment, this comparison may involve pattern matching against portions of the object code 260 and/or source code 263. In some cases, the object code 260 may be decompiled into source code 263 upon which the pattern matching is performed. Additionally, the static analysis service 227 may determine which identified device resources 251 are accessed, required, and/or requested by the application 103 through examination of the object code 260, source code 263, and/or metadata 266.

The fingerprint generation service 215 may also perform a dynamic analysis of the application 103 using the dynamic analysis service 230. The dynamic analysis may include executing an application instance 242 for the application 103 in a hosted environment 221 and determining which code paths are taken by the object code 260. This may indicate which of the identified code fragments 248 and/or identified device resources 251 are actually used by the application instance 242. Manual testing and/or automated testing of the application instance 242 may be performed in the hosted environment 221.

Meanwhile, resource consumption metrics 236 may be generated by the hosted environment 221 and sent to the metric collection service 218. Resource consumption metrics 236 may also be generated by a metric generation service 275 executed in a client 206. The resource consumption metrics 236 then may be reported back from the client 206 to the metric collection service 218 by way of the network 209. The dynamic analysis service 230 may then process the collected resource consumption metrics 236 to generate a resource consumption profile 254 for the application 103. The resource consumption profile 254 may, for example, indicate that an application 103 is processor intensive at a certain point in execution, that an application 103 appears to have a memory leak, that an application 103 uses up battery resources quickly, that an application 103 uses the display relatively frequently, and/or other patterns of resource consumption.

As testing users and potentially other users download the application 103, the application 103 may be installed on various clients 206, thereby allowing the behavioral analysis service 233 to process behavioral usage metrics 239 that reflect real-world use of the application 103 by users. The behavioral usage metrics 239 may be generated by the metric generation service 275 and sent to the metric collection service 218 by way of the network 209. The behavioral analysis service 233 may perform a behavioral analysis on the behavioral usage metrics 239 in order to generate a behavioral usage profile 257. The behavioral usage profile 257 may, for example, indicate locations of users when they use the application 103, duration of use for the application 103, times of day that the application 103 is used, close out points for the application 103 as determined by a synchronization service, and so on. The behavioral usage profile 257 may be indexed by user demographic data, which may include, for example, user language and country. Accordingly, different usage patterns may be ascertained in different countries, or where different languages are used.

The fingerprint generation service 215 then uses the results of the static analysis, dynamic analysis, and/or behavioral analysis to generate the application fingerprint 106. The application fingerprint 106 may include identifiers for each of a set of identified code fragments 248 used by the application 103, identifiers for each of a set of identified device resources 251 used by the application 103, identifiers that are correlated to various patterns of resource consumption as indicated by the resource consumption profile 254, identifiers that are correlated to various patterns of user behavior as indicated by the behavioral usage profile 257, and/or other data. If the application 103 has previously been added to the application marketplace 245, download popularity information 269 generated by the application marketplace system 224 may be available. Information indicative of a measure of download popularity may also be included in the application fingerprint 106.

In some cases, an application fingerprint 106 may inherit characteristics from other application fingerprints 106 that are generated for previous versions of the same application 103 or for similar applications 103. For example, a previous version of the application 103 may have an application fingerprint 106 that indicates that the mean duration of execution for the application 103 is five minutes. When a new version of the application 103 is released, insufficient behavioral usage metrics 239 may be available to determine the mean duration of execution. Thus, the application fingerprint 106 for the new version of the application 103 may inherit the previous mean duration of execution. As additional behavioral usage metrics 239 become available, the application fingerprint 106 may be regenerated.

As new versions of an application 103 are released, the corresponding application fingerprint 106 may be updated as well. In one embodiment, the fingerprint generation service 215 is configured to detect when a new version of the application 103 is uploaded to the application marketplace system 224. In response to the new version being uploaded, the fingerprint generation service 215 may be configured to regenerate the corresponding application fingerprint 106.

The application fingerprint 106 that has been generated may be used in many different ways. As an example, the application fingerprint 106 may be used in searching for applications 103 that have certain characteristics. To illustrate, suppose that a particular software library has been found to contain a significant defect. The identifier for the library could be obtained from the identified code fragments 248, and a fast search may be performed in the application fingerprints 106 to determine which application fingerprints 106 show a use of the particular software library.

Further, the application fingerprint 106 may be used to determine similarities among applications 103 based upon matching of application fingerprints 106. For example, clustering algorithms may be employed to determine groupings of applications 103, which may then result in categorization and assignment of categories 272 to applications 103. Also, a representative application 103 may be identified, and applications 103 that are similar may be determined using the respective application fingerprints 106. Likewise, this search may be employed as a basis of assigning a category 272 to an application 103.

To illustrate, a representative social networking application 103 may be selected, and the application fingerprints 106 may be searched to determine similar applications 103. For example, the similar applications 103 may have application fingerprints 106 that show long term execution in the clients 206, access requested for contact lists, access requested for sound and/or vibration devices, and/or other similar characteristics. The applications 103 that are determined may be assigned a category 272 of "social networking" in the application marketplace 245.

In some embodiments, the application 103 may be added, or not added, to the application marketplace 245 based at least in part on the application fingerprint 106. If the application fingerprint 106 shows use of a software library associated with malware, the application 103 may be flagged, restricted, or disallowed in the application marketplace 245. If the application fingerprint 106 shows high user interest based upon frequent user interactions documented in the behavioral usage profiles, the application 103 may be denoted as featured or otherwise given special emphasis in the application marketplace 245.

The fingerprint generation service 215 may also be configured to generate user lifestyle fingerprints 258, each reflecting a profile of the behavior or lifestyle of a particular user. The user lifestyle fingerprints 258 may be generated, for example, based at least in part on data gathered by the application marketplace system 224 (e.g., purchasing data) regarding particular users, behavioral usage metrics 239 associated with particular users, and other data. In some cases, the user lifestyle fingerprints 258 may be generated based at least in part on the application fingerprints 106 generated for specific applications 103 that used by the users.

Figure 3:
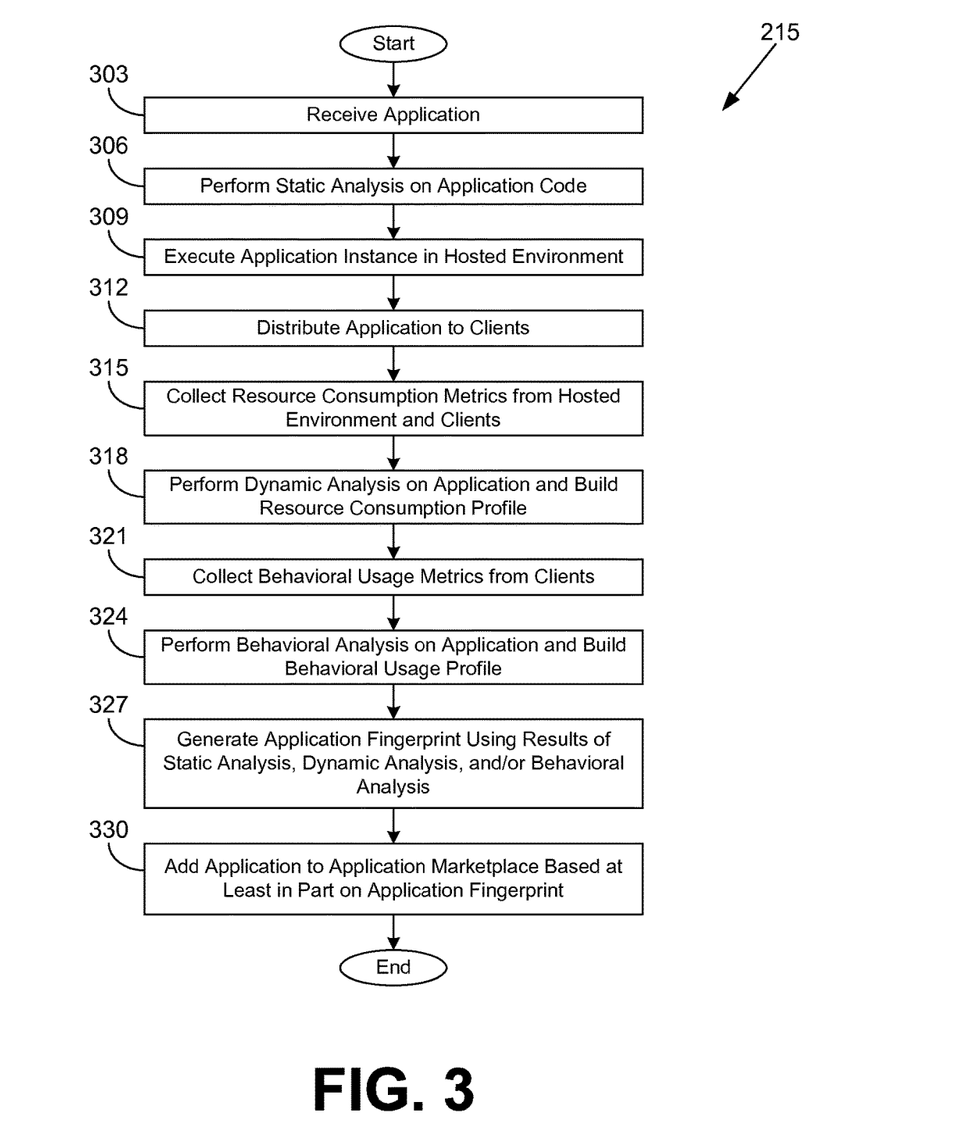
FIG. 3 is a flowchart illustrating one example of functionality implemented as portions of a fingerprint generation service executed in a computing environment in the networked environment of FIG. 2 according to various embodiments of the present disclosure.

Referring next to FIG. 3, shown is a flowchart that provides one example of the operation of a portion of the fingerprint generation service 215 according to various embodiments. It is understood that the flowchart of FIG. 3 provides merely an example of the many different types of functional arrangements that may be employed to implement the operation of the portion of the fingerprint generation service 215 as described herein. As an alternative, the flowchart of FIG. 3 may be viewed as depicting an example of steps of a method implemented in the computing environment 203 (FIG. 2) according to one or more embodiments.

Beginning with box 303, the fingerprint generation service 215 receives an application 103 (FIG. 1). For example, the application 103 may be uploaded or downloaded from a developer to the computing environment 203. In box 306, the static analysis service 227 (FIG. 2) of the fingerprint generation service 215 performs a static analysis on the application 103 using the object code 260 (FIG. 2), source code 263 (FIG. 2), and/or metadata 266 (FIG. 2). Through the static analysis, the static analysis service 227 determines identified code fragments 248 (FIG. 2) and/or identified hardware resources 251 (FIG. 2) that are used by the application 103.

In box 309, the fingerprint generation service 215 executes an application instance 242 (FIG. 2) of the application 103 in a hosted environment 221 (FIG. 2). In box 312, the fingerprint generation service 215 distributes the application 103 to clients 206 (FIG. 2). The application 103 may be distributed via the application marketplace system 224 (FIG. 2) or by another approach. The application 103 may then be executed as an application instance 242 on each of the clients 206. A metric generation service 275 (FIG. 2) installed on the clients 206 may be employed to generate various metrics.

In box 315, the fingerprint generation service 215 through the metric collection service 218 collects resource consumption metrics 236 (FIG. 2) from the hosted environment 221 and/or the clients 206. In box 318, the fingerprint generation service 215 uses the dynamic analysis service 230 (FIG. 2) to perform a dynamic analysis on the application 103, which may involve generating a resource consumption profile 254 (FIG. 2) from the resource consumption metrics 236. In box 321, the fingerprint generation service 215 collects behavioral usage metrics 239 (FIG. 2) from clients 206. In box 324, the behavioral analysis service 233 (FIG. 2) of the fingerprint generation service 215 performs a behavioral analysis on the application 103 and builds a behavioral usage profile 257 (FIG. 2).

In box 327, the fingerprint generation service 215 generates an application fingerprint 106 (FIG. 1) using the results of the static analysis, dynamic analysis, and/or the behavioral analysis. The application fingerprint 106 may also include download popularity information 269 (FIG. 2) and/or other data, and the application fingerprint 106 may inherit data from other application fingerprints 106. In box 330, the fingerprint generation service 215 adds the application 103 to the application marketplace 245 (FIG. 2) based at least in part on information included in the application fingerprint 106. Thereafter, the portion of the fingerprint generation service 215 ends.

Figure 4:
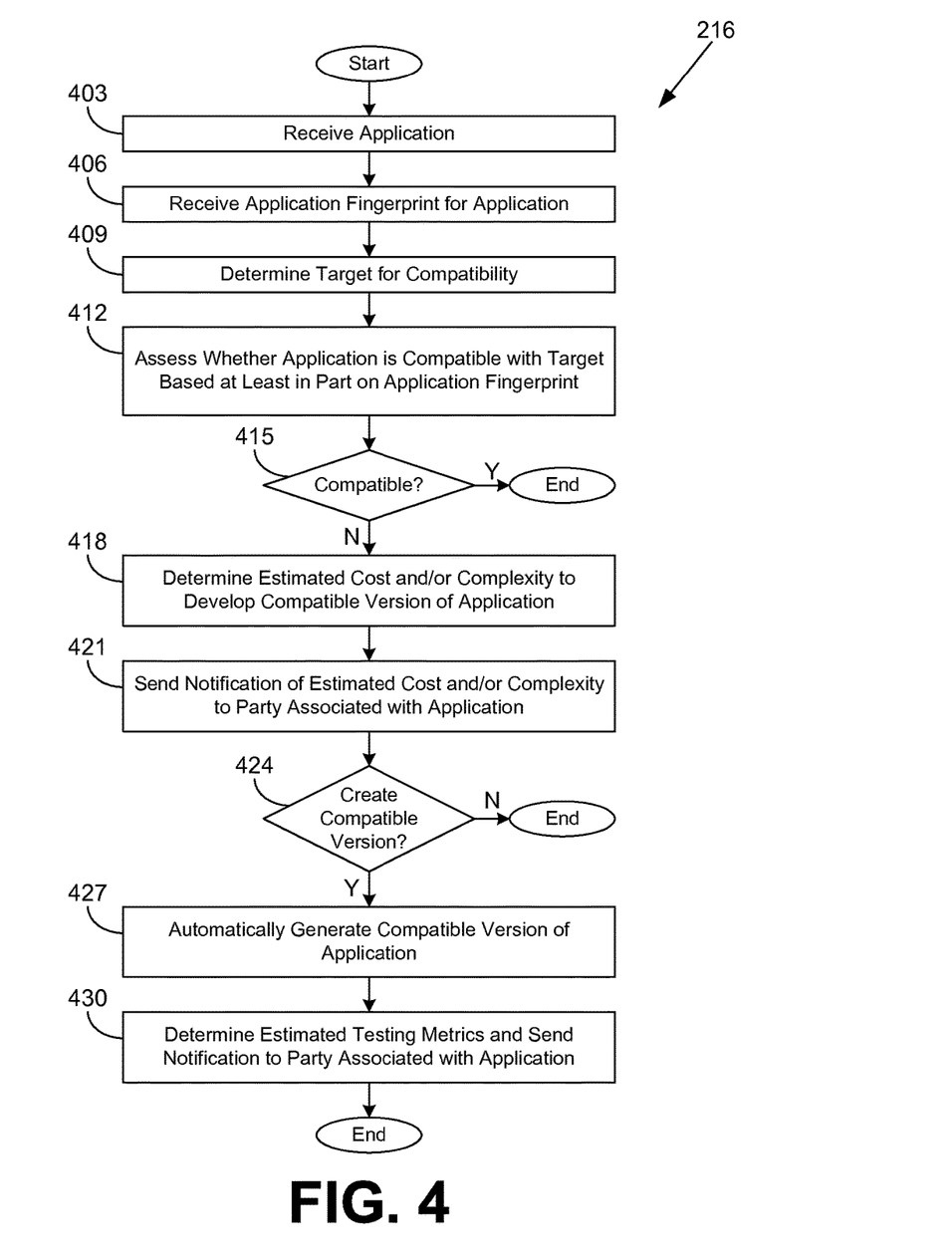
FIG. 4 is a flowchart illustrating one example of functionality implemented as portions of a versioning service executed in a computing environment in the networked environment of FIG. 2 according to various embodiments of the present disclosure.

Moving on to FIG. 4, shown is a flowchart that provides one example of the operation of a portion of the versioning service 216 according to various embodiments. It is understood that the flowchart of FIG. 4 provides merely an example of the many different types of functional arrangements that may be employed to implement the operation of the portion of the versioning service 216 as described herein. As an alternative, the flowchart of FIG. 4 may be viewed as depicting an example of steps of a method implemented in the computing environment 203 (FIG. 2) according to one or more embodiments.

Beginning with box 403, the versioning service 216 receives an application 103 (FIG. 1). In box 406, the versioning service 216 receives an application fingerprint 106 (FIG. 1) for the application 103. In box 409, the versioning service 216 determines a compatibility target for the application 103. As non-limiting examples, the compatibility target may correspond to a specific operating system platform, a specific version of an operating system, a device-specific version of the operating system, a particular version of an identified code fragment 248 (FIG. 2), a specific identified device resource 251 (FIG. 2), or other compatibility target.

In box 412, the versioning service 216 assesses whether the application 103 is compatible with the target based at least in part on the application fingerprint 106 of the application 103. The versioning service 216 may refer to specific rules within the compatibility data 255 to assess whether the application 103 is compatible with the target. As an example, the versioning service 216 may determine whether the identified code fragments 248 and/or identified device resources 251 of the application fingerprint 106 are indicated as compatible or incompatible with the target. As another example, the versioning service 216 may determine whether the resource consumption indicated by the application fingerprint 106 is supported by the target.

Alternatively, the versioning service 216 may compare the application fingerprint 106 of the application 103 to application fingerprints 106 of applications 103 which are known to be compatible with the target. For example, if the particular application 103 has similar resource consumption, identified code fragments 248, identified device resources 251, etc. to compatible applications 103 (as determined through analysis of the corresponding application fingerprints 106), the particular application 103 may be deemed compatible as well. In other embodiments, instead of assessing compatibility with a particular target, the versioning service 216 may determine a set of devices, operating system platforms, operating system versions, etc. that are incompatible with the particular application 103. A modification may be determined for the application 103 in order to facilitate compatibility with the set of devices, operating system platforms, operating system versions, etc. that are incompatible.

In box 415, the versioning service 216 determines whether the application 103 is deemed compatible with the target. If the application 103 is deemed compatible, the versioning service 216 may record the compatibility within the compatibility data 255, notify parties associated with the application 103, and/or perform other tasks. Thereafter, the portion of the versioning service 216 ends.

If, instead, the versioning service 216 determines that the application 103 is not deemed compatible with the target, the versioning service 216 proceeds from box 415 to box 418. In box 418, the versioning service 216 determines an estimated cost, an estimated complexity, and/or other metrics associated with generating a version of the application 103 that is compatible with the target. The versioning service 216 may refer to the application fingerprint 106 of the application 103 to determine various changes that may be needed in order to provide compatibility. The versioning service 216 may compare the application fingerprint 106 of the application 103 to application fingerprints 106 of other applications 103 to assist in determining the various changes. As a non-limiting example, the application fingerprint 106 may indicate a selection of incompatible identified code fragments 248 that would need to be replaced with alternative libraries to provide compatibility.

In one embodiment, estimated complexity or cost of developing the compatible version may be determined with reference to two existing versions of another application 103. For example, a first version of the other application 103 may be compatible with the same device (or otherwise have similar compatibility) as the current version of the instant application 103, while a second version of the other application 103 may be compatible with the target. The two versions of the other application 103 may be compared, thus providing an indication of how much work had to be done to create the compatible version of the other application 103. Such a comparison may be performed using the application fingerprints 106 of the respective versions of the other application 103. If the incompatible version of the other application 103 is similar to the instant application 103 (e.g., by having similar application fingerprints 106), the comparison between the two versions of the other application 103 may provide a good estimate as to the work involved in creating a compatible version of the instant application 103. Further, the comparison may be employed to make suggestions as to what changes (e.g., code rewrites, library changes, etc.) may need to be made in order to develop a compatible version of the instant application 103.

The version creation data 256 may include various parameters to control estimation of complexity, cost, etc. For example, the version creation data 256 may describe complexity (e.g., in programmer hours) to switch one incompatible library with another compatible library. As another example, the version creation data 256 may indicate costs for switching the same library, including programming costs, licensing costs, and so on. The version creation data 256 may include parameters for cost and complexity functions of the versioning service 216 for transitioning from one operating system platform to another, from operating system version to an updated version, and so on.

In box 421, the versioning service 216 sends the estimates of cost, complexity, and so on for developing a compatible version of the application 103 to a party associated with the application 103. Such a party may be a developer or other source of the application 103. The notification may be sent through a web page, email, phone call, text message, or other form of communication. The notification may describe a proposed modification to the application 103 in order to make the application 103 compatible.

In box 424, the versioning service 216 determines whether to create a compatible version of the application 103. If the versioning service 216 determines not to create the compatible version 103, e.g., if automatic creation is not possible or if the developer has not authorized such automatic creation, the portion of the versioning service 216 ends. Otherwise, the versioning service 216 continues to box 427.

In box 427, the versioning service 216 automatically generates a compatible version of the application 103 for the target. For example, the versioning service 216 may modify the source code 263 (FIG. 2) of the application 103 and recompile the application 103, modify the object code 260 (FIG. 2) of the application 103, modify the metadata 266 (FIG. 2) of the application 103, switch an incompatible software library with a compatible software library, and/or perform another modification to the application 103 as configured by parameters in the version creation data 256. In one embodiment, the versioning service 216 may determine compatible libraries or other modifications to be applied to the application 103 based at least in part on application fingerprints 106 of applications 103 determined to be compatible. After the compatible version of the application 103 is generated, the compatible version may be offered by way of the application marketplace system 224 (FIG. 2) as compatible with the target.

In box 430, the versioning service 216 determines estimated testing metrics for the generated version of the application 103 and sends a notification of the metrics to a party associated with the application 103. Such metrics may include, for example, an estimated testing duration, an estimated number of testers, an estimated number of testing cycles, and/or other metrics in order to sufficiently test the modifications of the application 103. Thereafter, the portion of the versioning service 216 ends.

Figure 5:
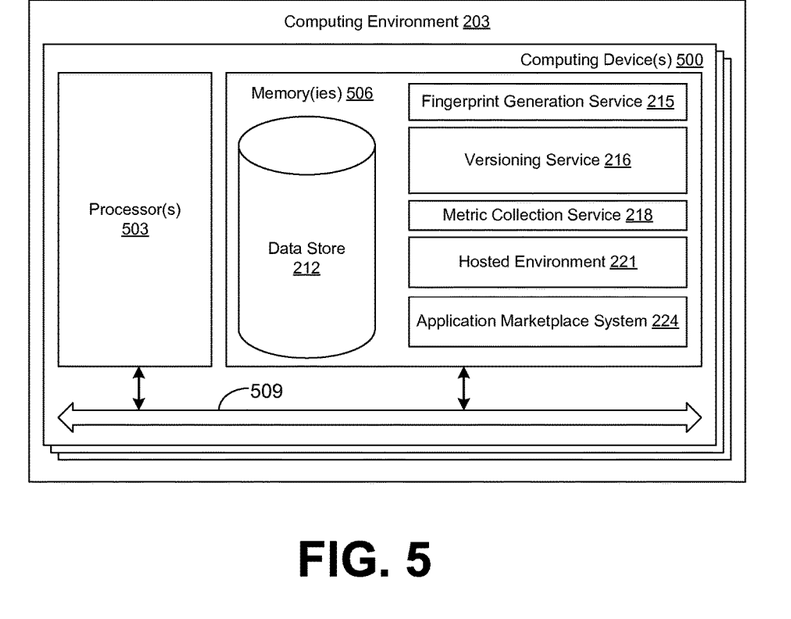
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 203 according to an embodiment of the present disclosure. The computing environment 203 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the fingerprint generation service 215, the versioning service 216, the metric collection service 218, the hosted environment 221, the application marketplace system 224, and potentially other applications. Also stored in the memory 506 may be a data store 212 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the fingerprint generation service 215, the versioning service 216, the metric collection service 218, the hosted environment 221, the application marketplace system 224, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3 and 4 show the functionality and operation of an implementation of portions of the fingerprint generation service 215 and the versioning service 216. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the fingerprint generation service 215, the versioning service 216, the metric collection service 218, the hosted environment 221, and the application marketplace system 224, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein when executed the program causes the at least one computing device to at least:
    receive a first one of a plurality of applications;
    receive a first one of a plurality of application fingerprints, a respective application fingerprint of the plurality of application fingerprints identifying respective application characteristics comprising at least one hardware device resource supported by a corresponding one of the plurality of applications, the respective application fingerprint being generated based at least in part on a static analysis and a dynamic analysis of the corresponding one of the plurality of applications,
    the static analysis comprising examination of the plurality of applications to identify the at least one hardware device resource accessed by each of the plurality of applications,
    the dynamic analysis comprising testing the plurality of applications by executing the plurality of applications in a hosted environment of the at least one computing device to determine actual usage of the at least one hardware device resource by each of the plurality of applications, the first one of the plurality of application fingerprints being associated with the first one of the applications;
    determine a compatibility target for the first one of the plurality of applications, the compatibility target identifying a particular hardware device resource of a target device, wherein the particular hardware device resource is hardware of the target device;
    determine that the particular hardware device resource is incompatible with the first one of the plurality of applications based at least in part on the first one of the plurality of application fingerprints and compatibility data that indicates that at least one application characteristic of the first one of the plurality of application fingerprints is incompatible with the particular hardware device resource of the compatibility target;
    automatically generate and store a compatible version of the first one of the plurality of applications that is compatible with the particular hardware device resource of the target device based at least in part on a second one of the plurality of application fingerprints associated with a second one of the plurality of applications that is compatible with the particular hardware device resource of the target device, identified by the static analysis and the dynamic analysis; and
    cause the compatible version of the first one of the plurality of applications that is compatible with the particular hardware device resource of the target device to be transmitted and installed on a client device comprising the particular hardware device resource.

2. The non-transitory computer-readable medium of claim 1, wherein when executed the program further causes the at least one computing device to at least automatically generate the compatible version of the first one of the plurality of applications by a modification to source code associated with the first one of the plurality of applications.

3. The non-transitory computer-readable medium of claim 1, wherein the compatible version of the first one of the plurality of applications is generated using a modification that is determined based at least in part on a comparison between a third one of the plurality of application fingerprints and the second one of the plurality of application fingerprints, the third one of the plurality of application fingerprints corresponding to another version of the second one of the plurality of applications that is incompatible with the particular hardware device resource.

4. A system, comprising:
    at least one computing device comprising at least one processor; and at least one service executable in the at least one computing device, wherein when executed the at least one service causes the at least one computing device to at least:

receive a first application fingerprint for a first application, the first application fingerprint identifies application characteristics comprising at least one hardware device resource, the first application fingerprint being generated based at least in part on a static analysis comprising examination of the first application to identify the at least one hardware device resource accessed by the first application and a dynamic analysis comprising executing the first application in a hosted environment of the at least one computing device to determine actual usage of the at least one hardware device resource by the first application;

determine a compatibility target for the first application, wherein the compatibility target identifies a hardware device resource of a target device, wherein the hardware device resource is hardware of the target device;

determine that the hardware device resource is incompatible with the first application based at least in part on the first application fingerprint and compatibility data that indicates that at least one of the application characteristics is incompatible with the hardware device resource of the target device;

automatically generate and store a compatible version of the first application that is compatible with the hardware device resource of the target device based at least in part on a second application fingerprint associated with a second application that is compatible with the hardware device resource of the target device, identified by static analysis and dynamic analysis of the second application; and cause the compatible version of the first application to be transmitted and installed on a client device comprising the hardware device resource.

5. The system of claim 4, wherein the application characteristic further comprise an indication of a set of code fragments employed by the first application and a set of device resources employed by the first application including the at least one hardware device resource.

6. The system of claim 4, wherein the compatible version of the first application ports the first application from a first operating system platform to a second operating system platform.

7. The system of claim 4, wherein the compatible version of the first application ports the first application from a first version of an operating system to a second version of the operating system.

8. The system of claim 7, wherein the second version of the operating system is specific to the target device having the hardware device resource.

9. The system of claim 4, wherein the compatible version of the first application is generated based at least in part on a modification to source code of the first application.

10. The system of claim 4, wherein the compatible version of the first application replaces a first code fragment of the first application with a second code fragment.

11. The system of claim 10, wherein when executed the at least one service further causes the at least one computing device to at least identify the second code fragment based at least in part on the second application fingerprint associated with the second application that is compatible with the hardware device resource, the second application fingerprint indicating use of the second code fragment by the second application.

12. The system of claim 4, wherein when executed the at least one service further causes the at least one computing device to at least:

determine at least one of an estimated complexity or an estimated cost associated with implementing a modification to generate the compatible version of the first application;

send a notification to a party associated with the first application, the notification describing the modification; and wherein the notification includes the at least one of the estimated complexity or the estimated cost.

13. The system of claim 4, wherein the first application fingerprint is derived from at least one of: calls in the first application to code libraries, and inclusion in the first application of one or more code fragments from a predefined set of code fragments.

14. A method, comprising:

receiving, by at least one computing device, a first application fingerprint for a first application, the first application fingerprint identifying application characteristics including a set of hardware device resources employed by the first application, the first application fingerprint being generated at least in part by a static analysis comprising examination of the first application to identify the set of hardware device resources accessed by the first application and a dynamic analysis comprising executing the first application in a hosted environment of the at least one computing device to determine actual usage of the set of hardware device resources by the first application;

determine a compatibility target for the first application, the compatibility target identifying a hardware device resource of a target device;

determining, by the at least one computing device, that the first application is not compatible with the hardware device resource of the target device based at least in part on the first application fingerprint and compatibility data that indicates that at least one of the application characteristics is incompatible with the hardware device resource of the target device; and automatically generating and storing, by the at least one computing device, a version of the first application that is compatible with the hardware device resource of the target device based at least in part on a second application fingerprint for a second application that is compatible with the hardware device resource of the target device, identified by static analysis and dynamic analysis of the second application; and causing, by the at least one computing device, the version of the first application that is compatible with the hardware device resource to be transmitted and installed on a client device comprising the hardware device resource.

15. The method of claim 14, wherein the version of the first application is generated based at least in part on a modification to source code of the first application.

16. The method of claim 14, further comprising determining an estimated testing metric for the generated version of the first application.

17. The method of claim 14, wherein automatically generating the version of the first application further comprises:

identifying, by the at least one computing device, a compatible code fragment based at least in part on the second application fingerprint for the second application; and replacing, by the at least one computing device, an incompatible code fragment of the first application with the compatible code fragment.

18. The method of claim 14, further comprising estimating, by the at least one computing device, at least one metric relating to testing of the version of the first application, the at least one metric comprising at least one of: an estimated testing duration, an estimated number of testers, or an estimated quantity of testing cycles.

19. The method of claim 14, wherein the first application fingerprint inherits characteristics from other application fingerprints that are generated for previous versions of the first application.

20. The method of claim 14, wherein the first application fingerprint inherits characteristics from other application fingerprints that are generated for similar applications.

21. The method of claim 14, further comprising uploading the version of the first application to an application marketplace.

\* \* \* \* \*